(12) United States Patent
Nishio et al.

(10) Patent No.: US 10,234,050 B2
(45) Date of Patent: Mar. 19, 2019

(54) CHECK VALVE

(71) Applicants: NITTO KOHKI CO., LTD., Tokyo (JP); TOYOTA JIDOSHA KABUSHIKI KAISHA, Aichi-ken (JP)

(72) Inventors: Takuya Nishio, Tokyo (JP); Hidetoshi Nohara, Tokyo (JP); Hirofumi Onishi, Aichi-ken (JP)

(73) Assignees: NITTO KOHKI CO., LTD., Tokyo (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/831,907

(22) Filed: Dec. 5, 2017

(65) Prior Publication Data

US 2018/0209557 A1    Jul. 26, 2018

(30) Foreign Application Priority Data

Jan. 26, 2017    (JP) .................. 2017-012110

(51) Int. Cl.
| | | |
|---|---|---|
| *F16K 15/02* | (2006.01) | |
| *F16K 15/06* | (2006.01) | |
| *F16K 27/02* | (2006.01) | |
| *F16K 31/122* | (2006.01) | |

(52) U.S. Cl.
CPC ........ *F16K 27/0209* (2013.01); *F16K 15/026* (2013.01); *F16K 15/063* (2013.01); *F16K 31/1221* (2013.01); *Y10T 137/7929* (2015.04); *Y10T 137/7932* (2015.04); *Y10T 137/7933* (2015.04)

(58) Field of Classification Search
CPC .............. F16K 27/0209; F16K 15/026; F16K 31/1221; F16K 15/063; Y10T 137/7929; Y10T 137/7932; Y10T 137/7933
See application file for complete search history.

(56) References Cited

U.S. PATENT DOCUMENTS

| | | | | |
|---|---|---|---|---|
| 1,890,223 A | * | 12/1932 | Kilzer ............... | Y10T 137/7933 137/543 |
| 3,749,122 A | * | 7/1973 | Gold ................. | Y10T 137/7933 137/543 |
| 6,039,073 A | * | 3/2000 | Messick et al. ... | Y10T 137/7933 137/543 |

(Continued)

FOREIGN PATENT DOCUMENTS

| | | |
|---|---|---|
| JP | 51-42122 | 4/1976 |
| JP | 2008-232361 | 10/2008 |

(Continued)

*Primary Examiner* — Marina Tietjen
*Assistant Examiner* — Frederick D Soski
(74) *Attorney, Agent, or Firm* — Wenderoth, Lind & Ponack, L.L.P.

(57) ABSTRACT

A check valve is provided which comprises a casing having a fluid passage, a valve seat member disposed in the fluid passage, and a valve element housing with a valve element disposed therein. The valve seat member has a valve seat surface on an end surface facing downstream. The valve element housing is a discrete member separate from the valve seat member and detachably secured to a downstream end portion of the same. The valve element is displaceable between a closed position and an open position.

4 Claims, 2 Drawing Sheets

(56) References Cited

U.S. PATENT DOCUMENTS

| | | |
|---|---|---|
| 2010/0108162 A1 | 5/2010 | Nishio et al. |
| 2013/0062349 A1 | 3/2013 | Sakai et al. |
| 2016/0018013 A1 | 1/2016 | Nishio et al. |
| 2016/0131273 A1 | 5/2016 | Onishi et al. |
| 2016/0195317 A1* | 7/2016 | Dam et al. ........ Y10T 137/7933 137/543 |

FOREIGN PATENT DOCUMENTS

| | | |
|---|---|---|
| JP | 2011-256972 | 12/2011 |
| JP | 2014-202254 | 10/2014 |
| JP | 2016-94962 | 5/2016 |
| WO | 2017/099103 | 6/2017 |
| WO | 2017/099106 | 6/2017 |

* cited by examiner

US 10,234,050 B2

CHECK VALVE

TECHNICAL FIELD

The present invention relates to check valves.

BACKGROUND ART

Among check valves for preventing backflow of fluid, there is one that comprises a casing having a fluid passage, a valve seat member disposed in the fluid passage, and a valve element closing the fluid passage by sealingly abutting against a valve seat surface of the valve seat member in the fluid passage. For example, Patent Literature 1 discloses a check valve wherein the valve element is urged so as to be pressed against the valve seat surface by a spring, and when a fluid pressure applied to the valve element in the forward direction exceeds the urging force of the spring, the valve element is displaced downstream to open the fluid passage, whereas when a fluid pressure is applied to the valve element in the reverse direction, the valve element is pressed against the valve seat surface by the urging force of the spring and the fluid pressure to maintain a state where the fluid passage is closed. In check valves used for fluid of relatively low pressure, a seal ring formed by an elastic member such as rubber is interposed between the valve element and the valve seat surface to seal between the valve element and the valve seat surface. Check valves used for high-pressure fluid involve the possibility that the seal ring may be broken by the high-pressure fluid, and are therefore often configured to close the fluid passage by a metal-to-metal sealing structure in which a valve element and valve seat member which are formed of a metal or other material of high rigidity are abutted directly against each other, as in the check valve of Patent Literature 1. To ensure high sealing performance with the metal-to-metal sealing structure, it is demanded that the valve seat surface and an abutting portion of the valve element that is to abut against the valve seat surface should be machined with high accuracy.

CITATION LIST

Patent Literature

Patent Literature 1: Japanese Patent Application Publication No. 2016-94962

SUMMARY OF INVENTION

Technical Problem

In the check valve disclosed in Patent Literature 1, the valve seat surface is formed at an inner part of a tubular valve seat member. Therefore, an elongated tool needs to be used for machining the valve seat surface. The distal end of such an elongated tool is likely to vibrate or shake, and it is therefore difficult to machine the valve seat surface with high accuracy. Further, because the machined valve seat surface is located at the inner part of the tubular valve seat member, it is also difficult to confirm whether or not the valve seat surface has been machined with high accuracy after the machining process. For these reasons, machining a valve seat surface with high accuracy has been a time-consuming complicated operation.

Accordingly, an object of the present invention is to provide a check valve configured to facilitate machining of a valve seat surface.

Solution to Problem

The present invention provides a check valve comprising the following elements: a casing having an upstream opening, a downstream opening, and a fluid passage extending from the upstream opening to the downstream opening; a valve seat member having an upstream end portion, a downstream end portion, and a communicating passage extending from the upstream end portion to the downstream end portion, the valve seat member being secured to the casing in the fluid passage and having a valve seat surface formed on an end surface thereof facing a downstream side of the fluid passage; a tubular valve element housing being a discrete member separate from the valve seat member and detachably secured to the downstream end portion of the valve seat member, the valve element housing extending downstream from the downstream end portion in the fluid passage and defining therein a valve element accommodating space; and a valve element disposed in the valve element accommodating space in the valve element housing slidably in the direction of a longitudinal axis of the valve element accommodating space, the valve element being displaceable between a closed position where the valve element abuts against the valve seat surface of the valve seat member to close the communicating passage and an open position where the valve element is located downstream of the closed position to separate from the valve seat surface, thereby opening the communicating passage.

In the check valve of the present invention, the valve seat surface is formed on the downstream end surface of the valve seat member; therefore, it is easier to machine the valve seat surface than in the case of a conventional check valve having a valve seat surface formed at a recessed position inside the valve seat member. It is also possible to facilitate confirmation of whether or not the valve seat surface has been machined with high accuracy. Consequently, it becomes possible to machine the valve seat surface with high accuracy even more easily by grinding or polishing.

Preferably, the arrangement may be as follows. The casing comprises a first casing member having the upstream opening, and a second casing member having the downstream opening and connected to the first casing member. The valve seat member has a seal portion projecting radially outward, the seal portion being clamped between the first casing member and the second casing member, thereby allowing the valve seat member to be secured to the casing while sealing between the first and second casing members. The valve seat member has an externally threaded portion on an outer peripheral surface of the downstream end portion, and the valve element housing has an internally threaded portion on an inner peripheral surface thereof. The valve element housing is secured to the valve seat member by threadedly engaging the internally threaded portion with the externally threaded portion. The valve seat member has on an outer peripheral surface thereof an abutting surface abutted by the upstream end surface of the valve element housing when the valve element housing is secured thereto, and a circumferentially extending strain-suppressing groove formed between the abutting surface and the seal portion.

When the seal portion of the valve seat member is clamped between the first casing member and the second casing member, strain is produced in the seal portion by strong forces received from the first and second casing members. The strain in the seal portion may cause strain to appear also in the secured position of the valve element housing because the secured position of the valve element housing is near the seal portion of the valve seat member due to the fact that the valve seat surface is formed on the end surface of the valve seat member. In this regard, however, the strain-suppressing groove is provided between the seal portion and the abutting surface, which is to be abutted by the upstream end surface of the valve element housing, as has been stated above. Therefore, the strain in the seal portion can be absorbed by the strain-suppressing groove, so that the influence of strain in the seal portion is prevented from extending to the abutting surface. Thus, it is possible to prevent deformation of the abutting surface by the strain in the seal portion, which would otherwise lead to loosening of the threaded engagement of the valve element housing.

Specifically, the valve element housing may have an outer peripheral surface comprising a large-diameter portion extending downstream from the upstream end surface of the valve element housing and a small-diameter portion extending downstream successively from the large diameter portion. The large-diameter portion is configured to be adjacent the inner peripheral surface of the second casing member defining the fluid passage. The small-diameter portion cooperates with the inner peripheral surface of the second casing member to define a gap for passage of fluid therebetween.

Further, the valve seat surface of the valve seat member may be a conical surface gradually enlarged in diameter toward the downstream side of the fluid passage.

An embodiment of the check valve according to the present invention will be explained below on the basis of the accompanying drawings.

DESCRIPTION OF EMBODIMENTS

Figure 1:
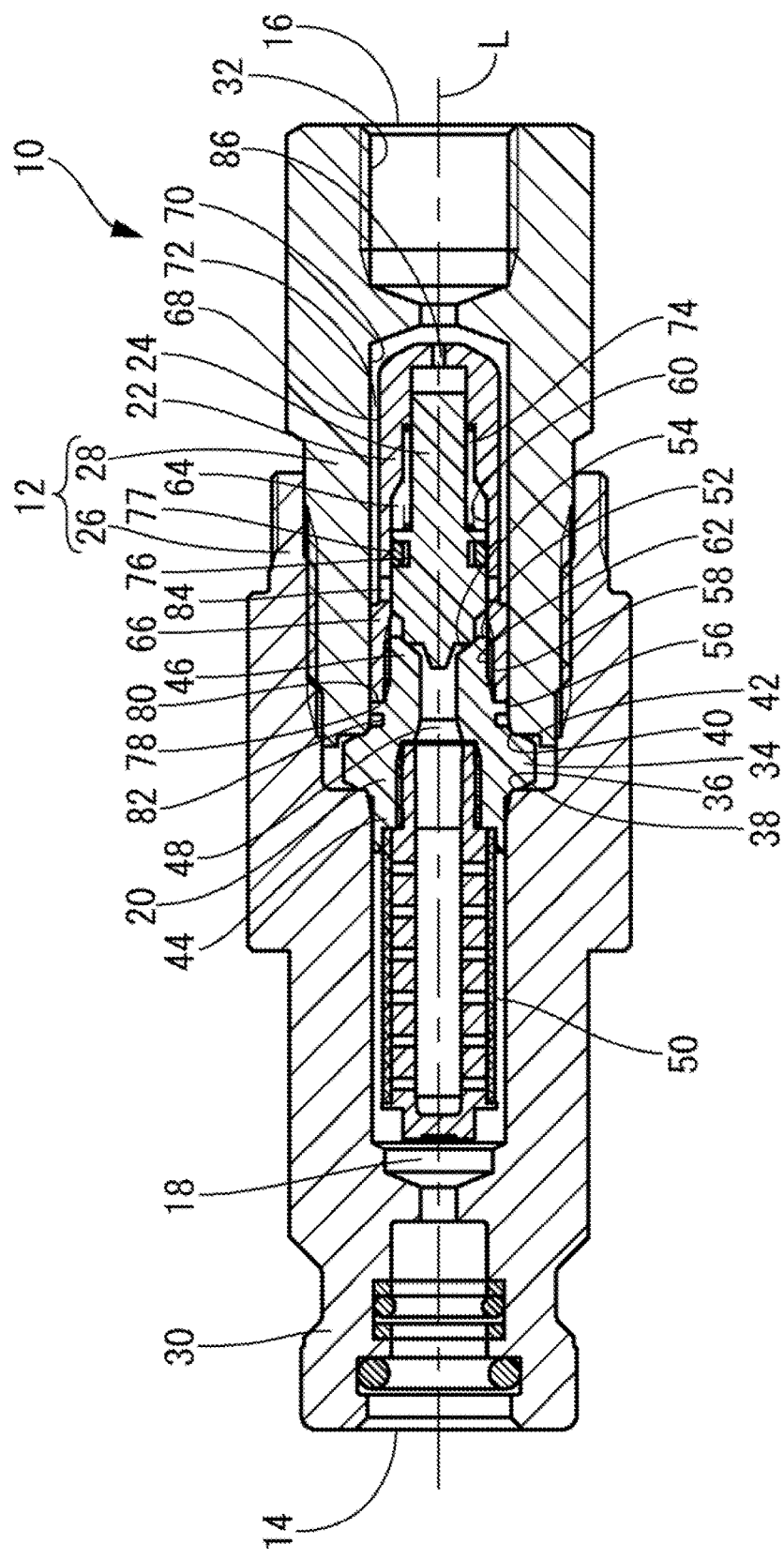
FIG. 1 is a sectional side view of a check valve according to an embodiment of the present invention, showing a state where a valve element is in a closed position.
Figure 2:
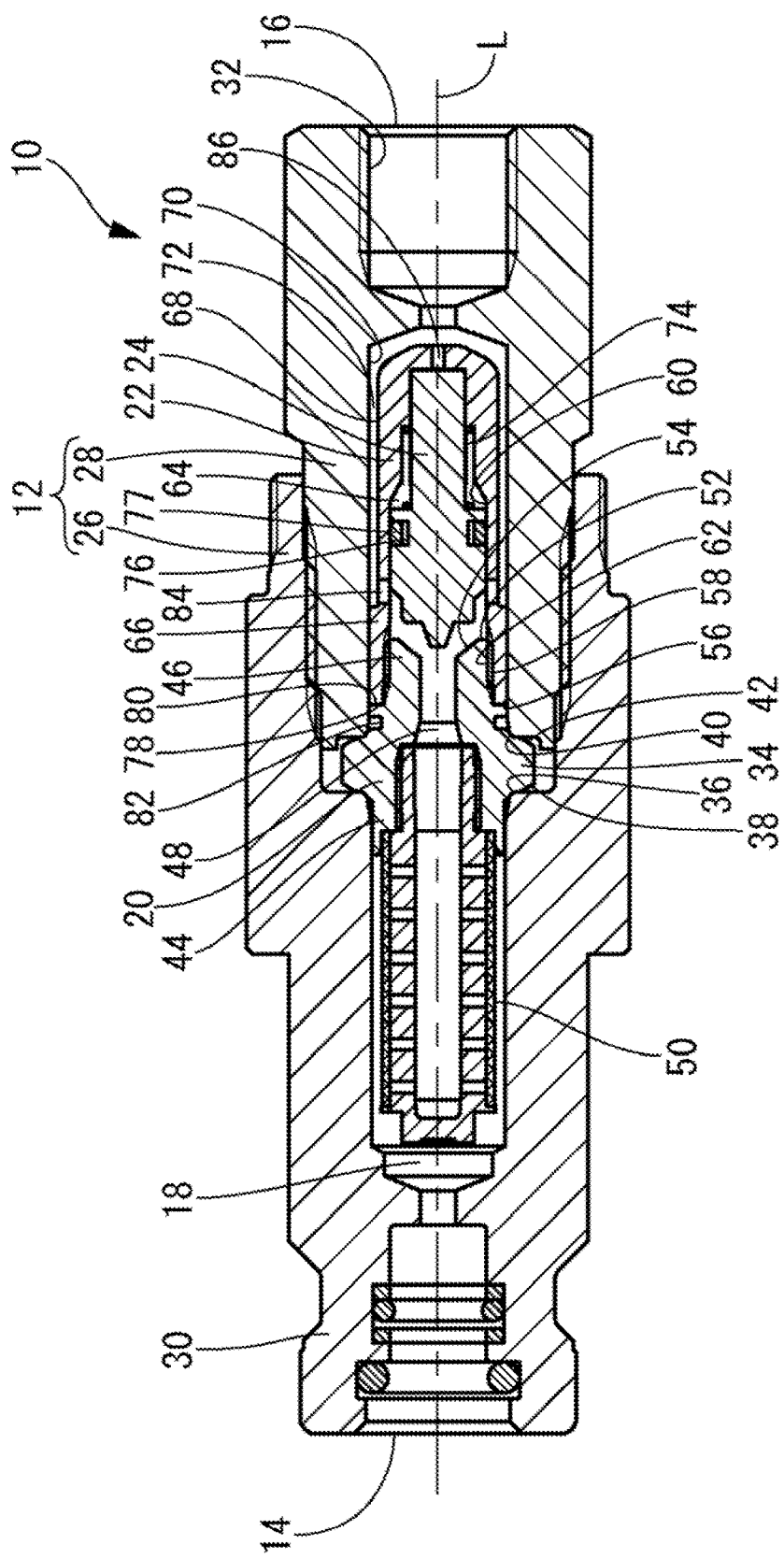
FIG. 2 is a sectional side view of the check valve of FIG. 1, showing a state where the valve element is in an open position.

A check valve 10 according to the present invention comprises, as shown in FIGS. 1 and 2, a casing 12 having a fluid passage 18 extending from an upstream opening 14 to a downstream opening 16, a valve seat member 20 disposed in the fluid passage 18, a valve element housing 22 secured to the valve seat member 20, and a valve element 24 disposed in the valve element housing 22. The check valve 10 is configured such that when a fluid pressure is applied to the valve element 24 from the downstream opening 16, the valve element 24 maintains a state (FIG. 1) where the valve element 24 closes the fluid passage 18, thereby preventing the fluid from flowing back toward the upstream side (leftward as seen in the figures), whereas when a fluid pressure greater than a predetermined pressure is applied to the valve element 24 from the upstream opening 14, the valve element 24 is displaced downstream (rightward as seen in the figures) to reach a state (FIG. 2) where the valve element 24 opens the fluid passage 18, thereby allowing the fluid to flow toward the downstream side.

The casing 12 comprises a first casing member 26 having the upstream opening 14, and a second casing member 28 having the downstream opening 16. The first casing member 26 and the second casing member 28 are connected by being threadedly engaged with each other. The first casing member 26 is formed with a nozzle connecting portion 30 configured such that a nozzle of a hydrogen supply hose at a hydrogen station, for example, is detachably connected to the nozzle connecting portion 30. The second casing member 28 is formed with a pipe connecting portion 32 to be connected with a pipe leading to a hydrogen tank in a fuel-cell vehicle, for example.

The valve seat member 20 has a seal portion 34 projecting radially outward. The seal portion 34 is clamped between the first casing member 26 and the second casing member 28, thereby allowing the valve seat member 20 to be secured to the casing 12 in the fluid passage 18. The seal portion 34 is tapered radially outward to have an inclined first seal surface 38 abutting against a pressing portion 36 of the first casing member 26, and an inclined second seal surface 42 abutting against a pressing portion 40 of the second casing member 28. The first and second casing members 26 and 28 and the valve seat member 20 are formed of metal materials, respectively. In this regard, however, the valve seat member 20 is formed of a metal material softer than the metal material constituting the casing 12. Accordingly, when the valve seat member 20 is clamped between the first casing member 26 and the second casing member 28, which are threadedly engaged with each other, the seal portion 34 of the valve seat member 20 is crushed by the pressing portion 36 of the first casing member 26 and the pressing portion 40 of the second casing member 28 and thus deformed in such a manner that the pressing portions 36 and 40 cut into the seal surfaces 38 and 40, respectively. Thus, the area between the first casing member 26 and the second casing member 28 is sealed through the valve seat member 20.

The valve seat member 20 has a communicating passage 48 extending from an upstream end portion 44 to downstream end portion 46 thereof so that fluid flowing from the upstream opening 14 toward downstream opening 16 of the casing 12 passes through the communicating passage 48. The upstream end portion 44 is detachably fitted with a filter 50 for removing dust from the fluid. The downstream end portion 46 has a valve seat surface 54 formed on a part of an end surface 52 facing the downstream side of the downstream end portion 46. The valve seat surface 54 is an annular conical surface gradually enlarged in diameter toward the downstream side of the fluid passage 18. The valve seat member 20 has an externally threaded portion 58 formed on an outer peripheral surface 56 of the downstream end portion 46. The externally threaded portion 58 is to be threadedly engaged with an internally threaded portion 62 formed on an inner peripheral surface 60 of the valve element housing 22 at a position near the upstream end thereof.

The valve element housing 22 is a discrete member separate from the valve seat member 20 and detachably secured to the valve seat member 20 by threadedly engaging the internally threaded portion 62 with the externally threaded portion 58 of the valve seat member 20, as has been stated above. The valve element housing 22 has a tubular shape extending further downstream from the downstream end portion 46 of the valve seat member 20 and defines therein a valve element accommodating space 64. The valve element housing 22 has a large-diameter portion 66 near the internally threaded portion 62 secured to the valve seat member 20, and a small-diameter portion 68 located downstream of the large-diameter portion 66. The large-diameter portion 66 has a size substantially the same as that of an inner peripheral surface 70 of the second casing member 28, and the small-diameter portion 68 has a size with which a gap 72 is formed between the small-diameter portion 68 and the inner peripheral surface 70 of the second casing member 28, the gap 72 being large enough for fluid to pass therethrough.

The valve element 24 is disposed in the valve element accommodating space 64 in the valve element housing 22 slidably in the direction of a longitudinal axis L of the fluid passage 18 relative to the inner peripheral surface 60 of the valve element housing 22. The valve element 24 is configured to be displaceable between a closed position (FIG. 1) where the valve element 24 abuts against the valve seat surface 54 of the valve seat member 20 to close the communicating passage 48, and an open position (FIG. 2) where the valve element 24 is located downstream of the closed position to separate from the valve seat surface 54, thereby opening the communicating passage 48. A spring 74 is disposed between the valve element 24 and the valve element housing 22 to urge the valve element 24 upstream. The valve element 24 has an annular recess 76 formed on an outer peripheral surface thereof, and an annular sliding resistance imparting member 77 is disposed in the annular recess 76. The sliding resistance imparting member 77 produces a predetermined sliding resistance between the valve element 24 and the valve element housing 22, thereby making it possible to prevent what is called chattering, i.e. a phenomenon where the valve element 24 repeats seating on and unseating from the valve seat surface 54 frequently when the difference between the pressure that the valve element 24 receives from the upstream side and the pressure that the valve element 24 receives from the downstream side becomes close to the magnitude of urging force of the spring and consequently the position of the valve element 24 becomes unstable.

The valve seat member 20 further has on the outer peripheral surface 56 thereof an abutting surface 80 abutted by an upstream end surface 78 of the valve element housing 22 when the valve element housing 22 is secured thereto, and a circumferentially extending strain-suppressing groove 82 formed between the abutting surface 80 and the second seal surface 42 of the seal portion 34 adjacently to the second seal surface 42. The valve element housing 22 is firmly secured to the valve seat member 20 by being threadedly engaged as far as a position where the upstream end surface 78 is pressed against the abutting surface 80. As has been stated above, the valve seat member 20 is sealingly secured to the casing 12 with the seal portion 34 clamped between the first and second casing members 26 and 28, and when the valve seat member 20 is secured to the casing 12 in this way, the pressing portions 36 and 40 of the first and second casing members 26 and 28 cut into the seal portion 34, which may cause the seal portion 34 to be strained. The strain in the seal portion 34 may exert influence even on the surroundings of the seal portion 34. If the strain-suppressing groove 82 is not formed, the influence of the strain may extend to the abutting surface 80. If the abutting surface 80 is deformed by the strain in the seal portion 34, a gap may be generated between the abutting surface 80 and the upstream end surface 78 of the valve element housing 22, and the threaded engagement of the valve element housing 22 may be loosened. If this occurs, the position of the valve element housing 22 relative to the valve seat member 20 becomes unstable, and the position of the valve element 24, which is held by the valve element housing 22, also becomes unstable, resulting in the valve element 24 being unable to abut against the valve seat surface 54 appropriately and hence unable to close the communicating passage 48 appropriately. In the check valve 10, the strain-suppressing groove 82 is formed between the second seal surface 42 and the abutting surface 80; therefore, the strain in the seal portion 34 can be absorbed by the strain-suppressing groove 82, so that it is possible to prevent deformation of the abutting surface 80, which is located beyond the strain-suppressing groove 82. Thus, it is possible to prevent loosening of the threaded engagement of the valve element housing 22 when the valve seat member 20 is secured to the casing 12.

When fluid is supplied from the upstream opening 14 of the casing 12 and a fluid pressure greater than a predetermined pressure is applied to the valve element 24 from the upstream side, the valve element 24 is displaced downward from the closed position (FIG. 1) to the open position (FIG. 2). When the valve element 24 is in the open position, the fluid passes through the filter 50 and the communicating passage 48 in the valve seat member 20 and further passes through a lateral opening 84 in the valve element housing 22 and through the gap 72 between the small-diameter portion 68 of the valve element housing 22 and the inner peripheral surface 70 of the second casing member 28 to flow to the downstream opening 16. When the fluid pressure at the upstream side is reduced relative to the downstream-side fluid pressure because, for example, of an increase in the downstream-side fluid pressure, the valve element 24 is returned to the closed position to close the communicating passage 48 by the urging force of the spring 74. When the supply of fluid from the upstream opening 14 stops and consequently the downstream-side fluid pressure becomes greater than the upstream-side fluid pressure, the valve element 24 is pressed upstream and against the valve seat surface 54 by a fluid pressure applied to the valve element 24 through a back-pressure opening 86 formed in the downstream end portion of the valve element housing 22 in addition to the urging force of the spring 74. Thus, the state where the fluid passage 18 is closed is maintained to prevent the fluid at the downstream opening 16 side from flowing back toward the upstream opening 14.

In the check valve 10, the valve seat surface 54 of the valve seat member 20 is formed on the end surface 52; therefore, the degree of freedom to select a machining method and a machining tool increases as compared to a structure in which a valve seat surface is formed at an inner part of a tubular member as in the conventional check valve. Accordingly, the valve seat surface 54 can be machined easily. It is also possible to facilitate confirmation of whether or not the valve seat surface 54 has been machined with high accuracy. Thus, it is possible not only to reduce the machining time and the machining cost but also to attain relatively easily a high machining accuracy that has conventionally been difficult to achieve.

Further, because the valve seat surface 54 is formed on the end surface 52 of the valve seat member 20, the secured position of the valve element housing 22 is near the seal portion 34 of the valve seat member 20; therefore, the influence of strain produced in the seal portion 34 is likely to extend to the secured portion of the valve element housing 22. In this regard, however, the strain-suppressing groove 82 is provided between the seal portion 34 and the abutting surface 80, which is abutted by the upstream end surface 78 of the valve element housing 22. Therefore, strain produced in the seal portion 34 is absorbed by the strain-suppressing groove 82, and the abutting surface 80 is not influenced by the strain in the seal portion 34.

REFERENCE SIGNS LIST

Check valve 10; casing 12; upstream opening 14; downstream opening 16; fluid passage 18; valve seat member 20;

valve element housing 22; valve element 24; first casing member 26; second casing member 28; nozzle connecting portion 30; pipe connecting portion 32; seal portion 34; pressing portion 36 (of first casing member 26); first seal surface 38; pressing portion 40 (of second casing member 28); second seal surface 42; upstream end portion 44; downstream end portion 46; communicating passage 48; filter 50; end surface 52; valve seat surface 54; outer peripheral surface 56; externally threaded portion 58; inner peripheral surface 60; internally threaded portion 62; valve element accommodating space 64; large-diameter portion 66; small-diameter portion 68; inner peripheral surface 70; gap 72; spring 74; annular recess 76; sliding resistance imparting member 77; upstream end surface 78; abutting surface 80; strain-suppressing groove 82; lateral opening 84; back-pressure opening 86; longitudinal axis L.

The invention claimed is:

1. A check valve comprising:
    a casing having an upstream opening, a downstream opening, and a fluid passage extending from the upstream opening to the downstream opening;
    a valve seat member having an upstream end portion, a downstream end portion, and a communicating passage extending from the upstream end portion to the downstream end portion, the valve seat member being secured to the casing in the fluid passage and having a valve seat surface on an end surface of the valve seat member facing a downstream side of the fluid passage;
    a tubular valve element housing which is a discrete member separate from the valve seat member and detachably secured to the downstream end portion of the valve seat member, the tubular valve element housing extending downstream from the downstream end portion of the valve seat member in the fluid passage and defining therein a valve element accommodating space; and
    a valve element disposed in the valve element accommodating space in the tubular valve element housing slidably in a direction of a longitudinal axis of the valve element accommodating space, the valve element being displaceable between a closed position where the valve element abuts against the valve seat surface of the valve seat member such that the communicating passage is closed and an open position where the valve element is located downstream of the closed position and separate from the valve seat surface of the valve seat member such that the communicating passage is open,
    wherein:
    the casing comprises a first casing member having the upstream opening, and a second casing member having the downstream opening and being connected to the first casing member; and
    the valve seat member has:
    a seal portion projecting radially outward, the seal portion being clamped between the first casing member and the second casing member, thereby allowing the valve seat member to be secured to the casing while sealing between the first casing member and the second casing member;
    an externally threaded portion on an outer peripheral surface of the downstream end portion of the valve seat member, the tubular valve element housing having an internally threaded portion on an inner peripheral surface of the tubular valve element, and the tubular valve element housing being secured to the valve seat member by threadedly engaging the internally threaded portion with the externally threaded portion; and
    on an outer peripheral surface of the valve seat member, an abutting surface abutted by an upstream end surface of the tubular valve element housing when the tubular valve element housing is secured thereto, and a circumferentially extending strain-suppressing groove defined between the abutting surface and the seal portion.

2. The check valve of claim 1, wherein the tubular valve element housing has an outer peripheral surface comprising a first diameter portion extending downstream from the upstream end surface of the tubular valve element housing while being adjacent to an inner peripheral surface of the second casing member defining the fluid passage, and a second diameter portion extending downstream successively from the first diameter portion to define a gap for passage of fluid between the second diameter portion and the inner peripheral surface of the second casing member, a diameter of the first diameter portion being larger than a diameter of the second diameter portion.

3. The check valve of claim 1, wherein the valve seat surface of the valve seat member is a conical surface enlarged in diameter toward the downstream side of the fluid passage.

4. The check valve of claim 2, wherein the valve seat surface of the valve seat member is a conical surface enlarged in diameter toward the downstream side of the fluid passage.

* * * * *